United States Patent [19]

Endo

[11] Patent Number: 5,077,881

[45] Date of Patent: Jan. 7, 1992

[54] TAPE SCRAPER AND PROCESS FOR PRODUCING SAME

[75] Inventor: Haruyoshi Endo, Muramayama, Japan

[73] Assignee: Nakamichi Corporation, Kodaira, Japan

[21] Appl. No.: 554,286

[22] Filed: Jul. 17, 1990

[30] Foreign Application Priority Data

Jul. 18, 1989 [JP] Japan .............................. 1-185719
Aug. 26, 1989 [JP] Japan .............................. 1-219071
Aug. 26, 1989 [JP] Japan .............................. 1-219072
Aug. 26, 1989 [JP] Japan .............................. 1-219073

[51] Int. Cl.⁵ ............................................. B23P 17/00
[52] U.S. Cl. ............................... 29/400.1; 15/256.5; 29/558; 51/161; 51/281 R
[58] Field of Search .................. 30/169, 170; 72/340; 29/400.1, 428, 557, 558, 897.33, 897.34, 897.35; 51/161, 281 R, 93.1; 15/236.5, 236.6, DIG. 12

[56] References Cited

U.S. PATENT DOCUMENTS

| | | | |
|---|---|---|---|
| 1,949,515 | 3/1934 | Norton ................................ | 29/558 |
| 3,602,940 | 9/1971 | Barbeau ............................ | 15/93.1 |
| 4,839,959 | 6/1989 | Mersing ......................... | 51/281 R X |
| 4,897,907 | 2/1990 | Kopiel et al. ..................... | 29/558 X |

Primary Examiner—Douglas D. Watts
Attorney, Agent, or Firm—Morrison Law Firm

[57] ABSTRACT

A tape scraper is made of a block of material having first and second planar internal surfaces disposed at an angle relative to each other. An external surface of the block is ground by a grindstone, while the block is rotated about an axis. The axis is located in a plane bisecting the angle between the planar internal surfaces. Grinding is continued until a groove between the two planar surfaces is opened to form facing knife edges. Rigid alignment of the knife edges is maintained by portions of the material which remain after grinding that connect the separated portions together.

15 Claims, 10 Drawing Sheets

PRIOR ART

TAPE SCRAPER AND PROCESS FOR PRODUCING SAME

BACKGROUND OF THE INVENTION

1. Technical Field

This invention relates to process for producing a tape scraper having a pair of edges, in which the pair of edges are formed linearly in parallel with each other.

2. Prior Art

For a magnetic record/playback device, it is required to remove any dust stuck on a recording surface of a magnetic tape, so that a tape scraper having a pair of edges contacting the recording surface of magnetic tape is disposed in a running route of the magnetic tape. According to this kind of tape scraper, in order that the magnetic tape may run without twisting between the pair of edges and any dust stuck on the recording surface may be removed effectively, the pair of edges must be disposed in parallel with other in the running route of magnetic tape, positioning in a perpendicular state relative to a running direction of magnetic tape.

Figure 7:
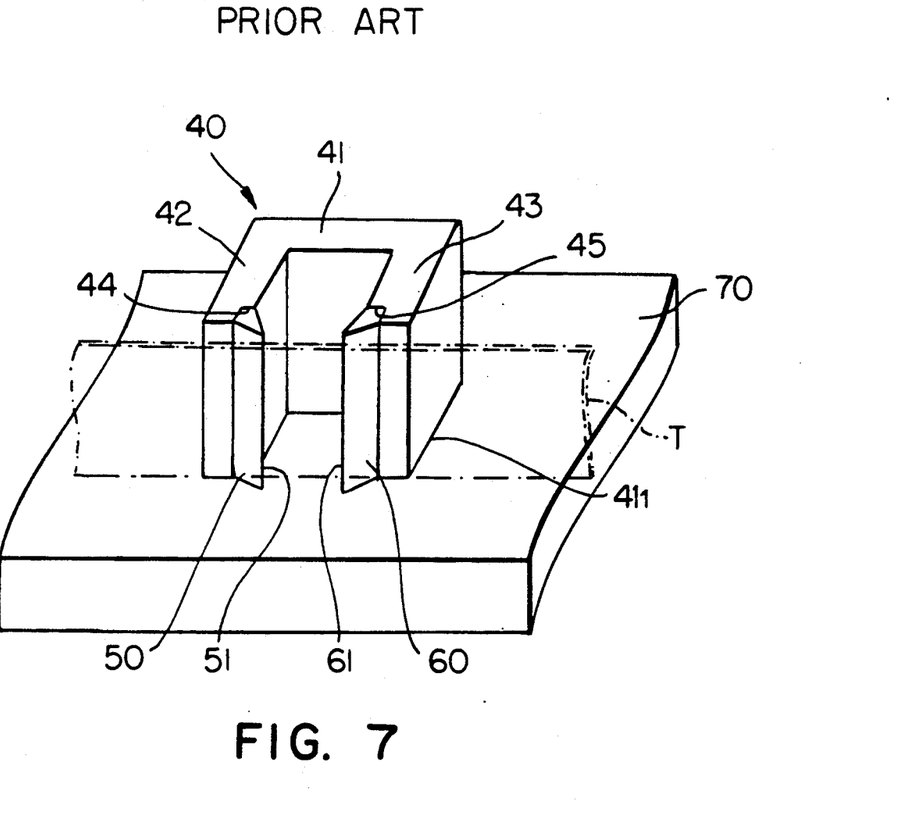
FIG. 7 is a perspective view of a conventional tape scraper.

FIG. 7 shows an example of a conventional tape scraper, in which a tape scraper 40 comprises a nearly U-shape sectioned base block 41 and a pair of knife edge members 50 and 60 fixed on cutaway portions 44 and 45 formed on opposing walls 42 and 43 of base block 41. A bottom surface 41$_1$ of base block 41 is positioned in the running route of magnetic tape T mounted on a main chassis 70, on which a magnetic head (not illustrated) is disposed. Accordingly, if magnetic tape T is running in a rightward direction in FIG. 7, any dust or the like stuck on the recording surface of magnetic tape T are removed by an edge 61 of a knife edge member 60 located in the downstream direction. On the other hand, if magnetic tape T is running in a leftward direction in FIG. 7, dust and the like are removed by an edge 51 of knife edge member 50.

Figure 8A:
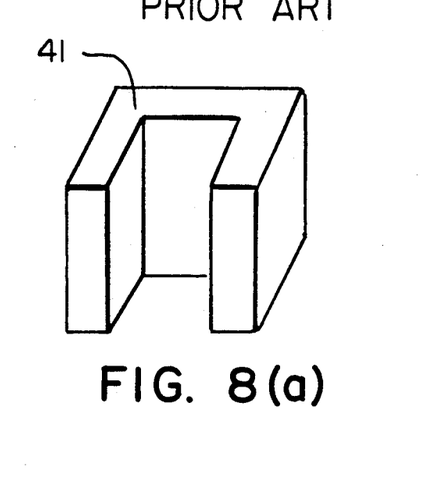
FIGS. 8(a) to 8(c) respectively are views showing the steps for producing a conventional tape scraper.

Now, a process for producing tape scraper 40 is discussed. As shown in FIG. 8(a), a nearly U-shape sectioned base block 41 is prepared by grinding a prismatic material made of, for example, aluminum. As used herein, the word "prismatic" is taken to mean a body having top and bottom surfaces that are generally parallel to each other. Such a body may be, for example, a paralleliped. Bodies having more or less than four surfaces, and with non-parallel surfaces should not be excluded from the definition.

Figure 8B:
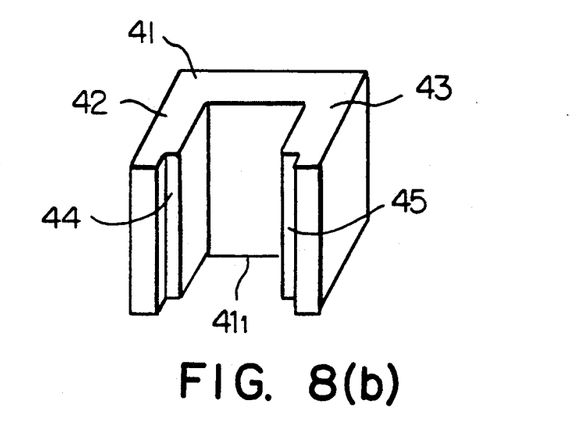

Subsequently, as shown in FIG. 8(b), cutaway portions 44 and 45 are formed upon opposing walls 42 and 43 perpendicular to bottom surface 41$_1$.

Figure 8C:
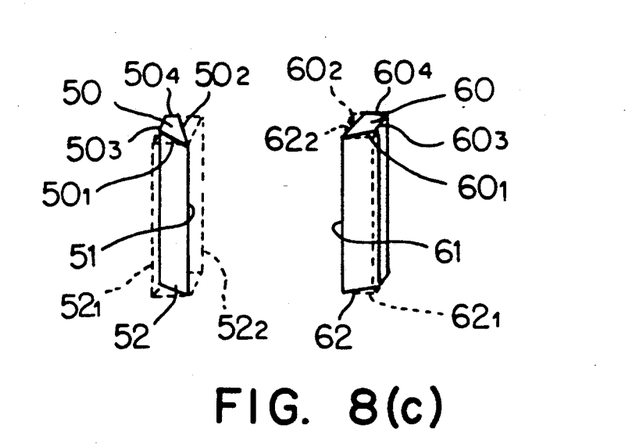

Referring to FIG. 8(c), a prismatic bar 52 made of a hard non-magnetic material such as, for example, sapphire, ceramic or the like is ground to remove sides 52$_1$ and 52$_2$, to form knife edge member 50. Similarly, sides 62$_1$ and 62$_2$ are removed from a prismatic bar 62 to form knife edge member 60.

Further, surfaces 50$_1$ and 50$_2$, and 60$_1$ and 60$_2$, formed by removing sides 52$_1$ and 52$_2$, and 62$_1$ and 62$_2$, respectively are lapped to provide a mirror finish. Then, knife edge members 50 and 60 are installed in cutaway portions 44 and 45, respectively using, for example, a suitable adhesive, to form the finished tape scraper 40 as shown in FIG. 7.

However, according to the foregoing conventional process, base block 41, knife edge members 50 and 60, having edges 51 and 61, respectively, are formed as separate components which are then united into a unitary tape scraper 40 using a suitable adhesive. As a result of an unbalanced thickness of the adhesive layer or some manufacturing inaccuracy of respective components, the parallelism of edges 51 and 61 may be unsatisfactory. In addition the accuracy with which edges 51 and 61 are maintained perpendicular degree to the running direction of magnetic tape T may not be satisfactory.

OBJECTS AND SUMMARY OF THE INVENTION

Accordingly, it is an object of the invention to provide a tape scraper that overcomes the drawbacks of the prior art.

It is a further object of the invention to provide a tape scraper that is formed of a unitary block by rotating the unitary block about an axis while an exterior surface is in contact with a grindstone. A pair of planar internal surfaces are opened by the grinding to produce parallel facing knife edges.

Briefly stated, the present invention provides a tape scraper that is made of a block of material having first and second planar internal surfaces disposed at an angle relative to each other. An external surface of the block is ground by a grindstone, while the block is rotated about an axis. The axis is located in a plane bisecting the angle between the planar internal surfaces, and is parallel to the first and second planar internal surfaces. Grinding is continued until a groove between the two planar surfaces is opened to form facing knife edges. Rigid alignment of the knife edges is maintained by portions of the material which remain after grinding that connect the separated portions together.

According to an embodiment of the invention, there is provided a process for producing a tape scraper having a pair of edges contacting a surface of a tape, comprising: forming a block having a flattened first wall surface and a flattened second wall surface, the first and second wall surfaces being disposed at an angle to form a nearly V-shaped groove in a longitudinal direction, fixing a columnar member with the block so that an axis of the columnar member is positioned in parallel with the first and second wall surfaces, and a circumference thereof contacts the first and second wall surfaces, and rotating the block about an axis on a bisector of the angle and parallel to the axis of the columnar member, while contacting the block with a grindstone having a contacting surface parallel with the axis, thereby grinding a surface of the block so as to reach a space between the first and second wall surfaces, and the circumference of the columnar member.

According to a feature of the invention, there is provided a process for producing a tape scraper provided with a pair of edges contacting a surface of a tape, comprising: forming a block having a flattened surface of a first wall and a flattened surface of a second wall, the first and second flattened surfaces being disposed at an angle with respect to each other to form a nearly V-shaped groove in a longitudinal direction, connecting the first wall and the second wall together with a connecting member, and rotating the block about an axis disposed in a plane bisecting the angle, and parallel with the flattened surfaces of the first and second walls, while contacting the block with a grindstone having a contacting surface parallel with the axis, thereby grinding the block by the grindstone until the surface of the first wall and the surface of the second wall are cut off.

According to a further feature of the invention, there is provided a process for producing a tape scraper provided with a pair of edges contacting a surface of a tape, comprising: preparing a block having a first flattened surface of a first wall and a second flattened surface of a second wall, the step of preparing including maintaining first and second opposing end walls in a longitudinal direction of the block, disposing the first and second flattened surfaces at an angle with respect to each other to form a nearly V-shaped groove, and rotating the block about an axis disposed in a plane bisecting the angle, and parallel to the first and second flattened surfaces of the first and second walls, while contacting with the block a grindstone having a contacting surface parallel with the axis, thereby grinding the block by the grindstone until the surface of the first wall and the surface of the second wall are cut off.

According to a still further feature of the invention, there is provided a process for producing a tape scraper provided with a pair of edges contacting a surface of a tape comprising: forming a block having a flattened first wall surface and a flattened second wall surface, the first and second flattened wall surfaces being disposed at an angle with respect to each other to form a nearly V-shaped groove in a longitudinal direction, rotating the block about an axis in a plane bisecting the angle, and parallel to the first and second flattened wall surfaces, contacting a grindstone with the block, a contacting surface of the grindstone having a longitudinal dimension that is smaller than a longitudinal dimension of the block, continuing grinding the block until the first wall surface and the second wall surface are opened to open the groove, and form knife edge members having first and second knife edges facing each other, and first and second uncut portions of the block, beyond a length of the grindstone, retaining the first and second knife edge members in a rigid assembly.

According to a still further feature of the invention, there is provided a method for producing a tape scraper comprising: forming an L-shaped block having a first wall including a first internal surface, and a second wall having a second internal surface, the first and second internal surfaces being inclined to each other at an angle, polishing the first and second internal surfaces to a mirror finish, the first and second internal surfaces forming a groove at a junction thereof, supporting the first and second walls against relative motion, grinding an outer surface of the L-shaped block in an arc, positioning a center of the arc along a bisector of the angle, continuing the grinding until at least a portion of the groove is opened, thereby forming first and second arc-shaped tape-guiding surfaces, the first and second tape-guiding surfaces having first and second parallel knife edges facing each other, and polishing the first and second tape-guiding surfaces.

According to a still further feature of the invention, there is provided a tape scraper comprising: a cylindrical columnar member, first and second tape scraper elements rigidly affixed to the columnar member, the first and second tape scraper elements including first and second arc-shaped contacting surfaces, respectively, the first and second arc-shaped contacting surfaces including first and second facing knife edges respectively, and the first and second arc-shaped contacting surfaces having a common center of arc.

According to another feature of the invention, there is provided a tape scraper comprising: a connecting member, first and second knife-edge members rigidly affixed to the connecting member, the first and second knife-edge member including first and second planar internal surfaces, the first and second planar internal surfaces being inclined at an angle with respect to each other, the first and second knife-edge members including first and second knife edges facing each other, the first and second knife-edge members including first and second arc-shaped contacting surfaces, and a center of arc of the first and second arc-shaped contacting surfaces being disposed on a plane bisecting the angle.

According to yet another feature of the invention, there is provided a tape scraper comprising: first and second end walls, a first knife edge member bridging the first and second end walls, a second knife edge member bridging the first and second end wall, parallel to the first knife edge member, the first and second knife edge members including first and second planar internal surfaces,respectively,the first and second planar internal surfaces being disposed at an angle with respect to each other, the first and second end walls, and the first and second knife edge members being integrally formed, the first and second knife edge members including first and second arc-shaped guiding surfaces, respectively, and a center of arc of the first and second arc-shaped guiding surfaces being disposed on a plane bisecting the angle.

According to another feature of the invention, there is provided a tape scraper comprising: a first knife edge member, the first knife edge member including a first planar internal surface, a second knife edge member, the second knife edge member including a second planar internal surface, the first and second internal surfaces being inclined to each other at an angle, a first uncut side joining a first end of the first and second knife edge members, a second uncut side joining a second end of the first and second knife edge members, a first tape guiding surface on the first knife edge member, a second tape guiding surface on the second knife edge member, the first and second tape guiding surfaces being arc shaped, a center of arc of the first and second tape guiding surfaces being disposed in a plane bisecting the angle, and the first and second uncut sides being disposed apart a distance at least substantially equal to a width of a tape with which the tape scraper is to be used, whereby the first and second uncut sides serve as edge guides for the tape.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Referring to FIG. 1, a parallelepiped solid block 1 is prepared of a hard, non-magnetic material such as, for example sapphire. A length I of solid block 1 is slightly greater than the width of a magnetic tape T (not illustrated).

Figure 1A:
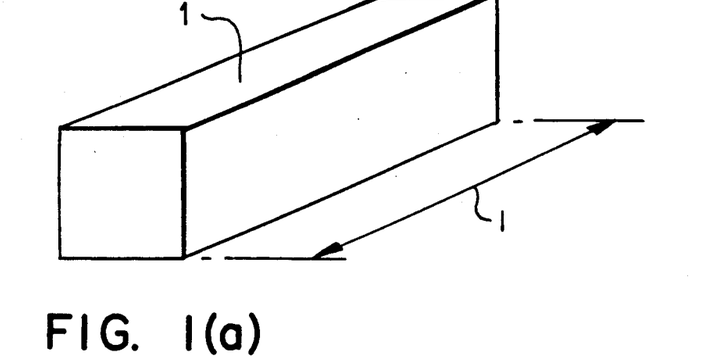
FIGS. 1(a) to 1(g) and FIGS. 2(a) and 2(b) respectively are views of a first embodiment according to this invention.
Figure 1B:
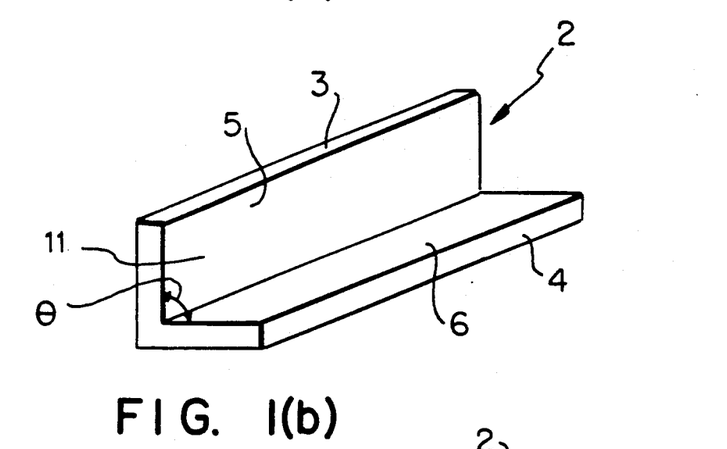

Solid block 1 is ground to an L shaped block 2, as shown in FIG. 1(b) having a first wall 3 and a second wall 4 forming a groove 11 therebetween. The thicknesses of walls 3 and 4 are substantially equal.

An internal surface 5 of wall 3 is ground, lapped and finished with a flat mirror surface. Similarly, an internal surface 6 of wall 4 is ground, lapped and finished with a flat mirror surface. An angle theta of groove 11 is 90 degrees in a longitudinal direction of block 2.

Figure 1C:
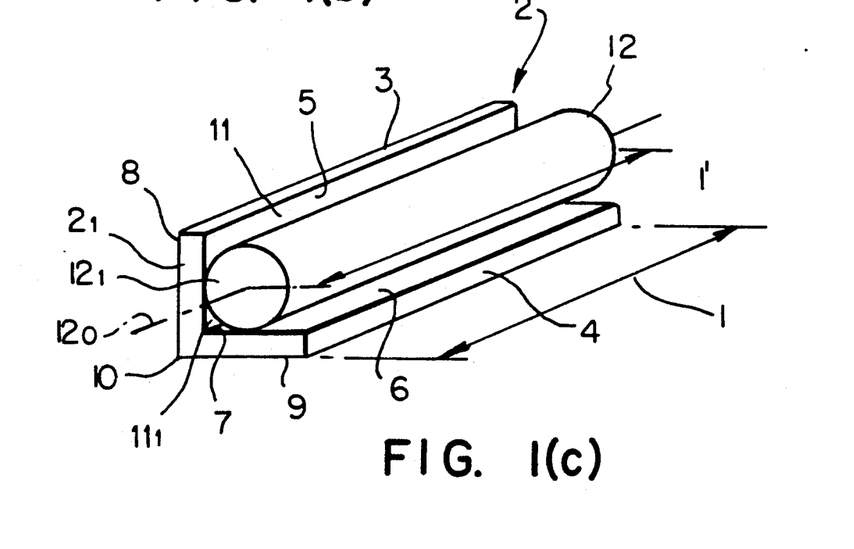

As shown in FIG. 1(c), a cylindrical columnar member 12 is placed in groove 11. A length I' of columnar member 12 is greater than the length I of block 2. One end surface $12_1$ of columnar member 12 is coplanar with one end surface $2_1$ of block 2. Columnar member 12 is affixed to internal surfaces 5 and 6 by any convenient technique such as, for example, adhesive or glass bonding. A small space $11_1$ is formed in groove 11 between internal surfaces 5 and 6 and columnar member 12.

The above technique places an axis $12_0$ of columnar member 12, a nodal line 7 between internal surfaces 5 and 6, and an edge line 10 between external surfaces 8 and 9 in parallel with each other.

Figure 1D:
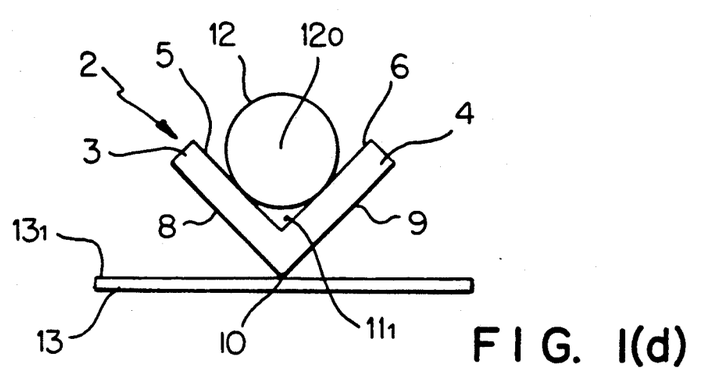
Figure 1E:
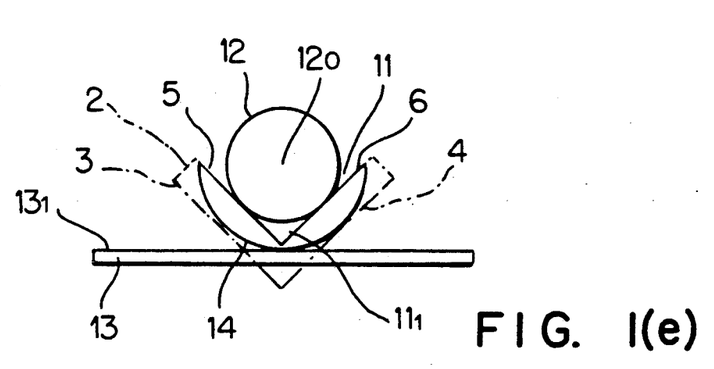

As shown in FIG. 1(d), block 2 is held in contact with a surface $13_1$ of a grindstone 13 such that surface $13_1$ contacts edge line 10 between external surfaces 8 and 9, parallel to axis $12_0$ of columnar member 12. L-shaped block 2 is rotated, for example, clockwise about axis $12_0$ while grindstone 13 is moved slowly toward axis $12_0$ while maintaining its surface $13_1$ parallel to axis $12_0$. A portion of block 2, indicated by a broken dotted line is removed, as shown in FIG. 1(e). That is, a surface 14 contacting grindstone 13 is ground in an arc in which a vertical distance between axis $12_0$ and grinding surface $13_1$ forms the radius of curvature of surface 14. Instead of being rotated in a single direction, block 2 may rotated in alternating clockwise and counterclockwise directions about axis $12_0$.

Figure 1F:
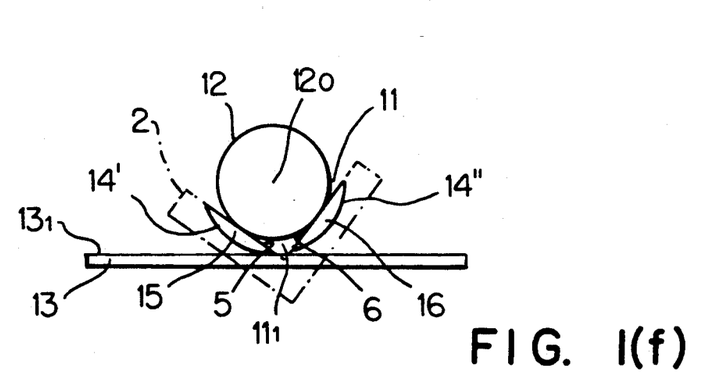

As shown in FIG. 1(f), on completion of grinding surface $13_1$ has move upward to position which opens up a space $11_1$ by cutting off the intersection between contacting surface 14, thereby forming spaced-apart contacting surfaces 14' and 14". The adjacent edges of contacting surfaces 14' and 14" form knife edges 15 and 16, respectively.

Figure 1G:
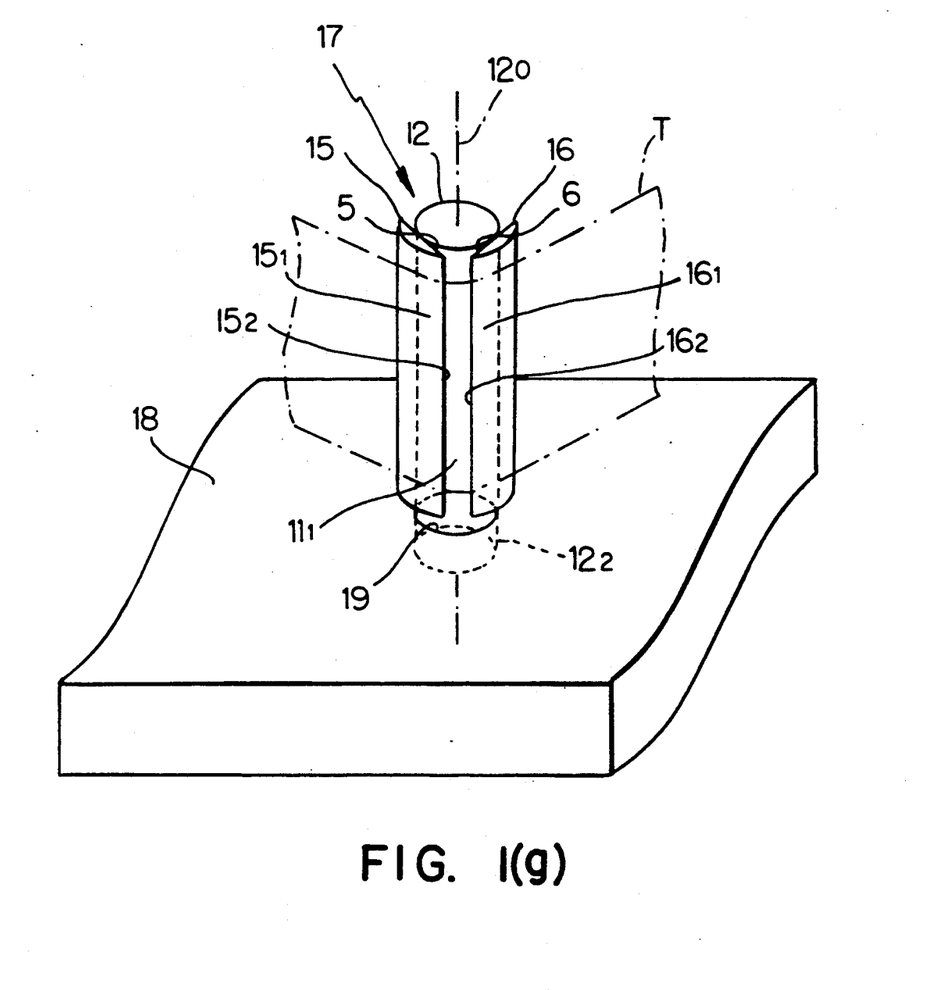

Subsequently, contacting surfaces 14' and 14" are lapped and finished with mirror surfaces, thereby forming tape guiding surfaces $15_1$ and $16_1$ as shown in FIG. 1(g).

In the above manner a tape scraper 17, the edge line between tape guiding surfaces $15_1$ and $16_1$ and internal surfaces 5 and 6 form respective edges $15_2$ and $16_2$. Each of tape guiding surfaces $15_1$ and $16_1$ describes an arc about $12_0$ which was used as the center of rotation of block 2 during the grinding process described above. Further, internal surfaces 5 and 6 are flat, smooth, and have an angle theta of 90 degrees therebetween in a longitudinal direction of block 2. As a consequence, edges $15_2$ and $16_2$ are formed linearly in parallel with axis $12_0$.

Tape scraper 17, produced by the foregoing process, is disposed in a preferred running route of magnetic tape T by inserting an end $12_2$ of columnar member 12 into a hole 19 in a main chassis 18.

As discussed above, block 2 is ground, while being rotated about axis $12_0$ of columnar member 12, to form edges $15_2$ and $16_2$ linearly in parallel with each other by a simple process. Since axis $12_0$ of the resulting tape scraper 17 is perpendicular to main chassis 18, edges $15_2$ and $16_2$ are also perpendicular to the running direction of magnetic tape T. Since tape guiding surfaces $15_1$ and $16_1$ of tape scraper 17 are formed in an arc about axis $12_0$, the running direction of magnetic tape T guided by tape guiding surfaces $15_1$ and $16_1$ does not rely upon a rotation within a given scope of tape scraper 15 about axis $12_0$. Accordingly, when axis $12_0$ of tape scraper 17 is positioned accurately on main chassis 18, it is thereby positioned perpendicular to a preferred running route of magnetic tape T.

Figure 2A:
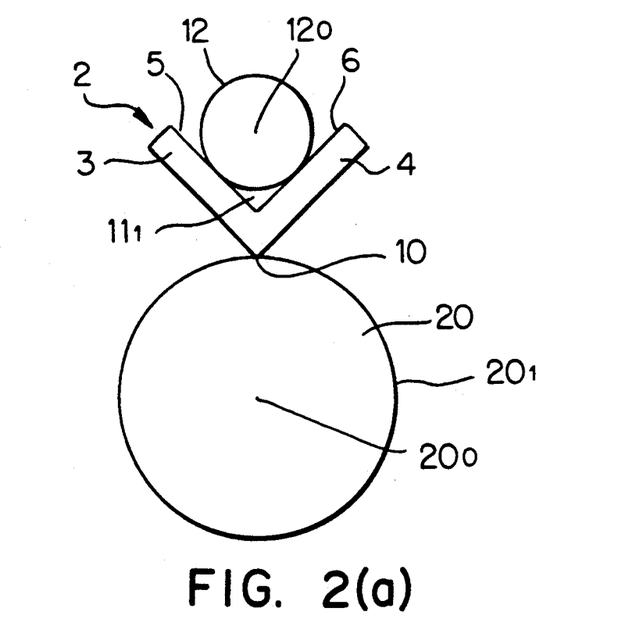
Figure 2B:
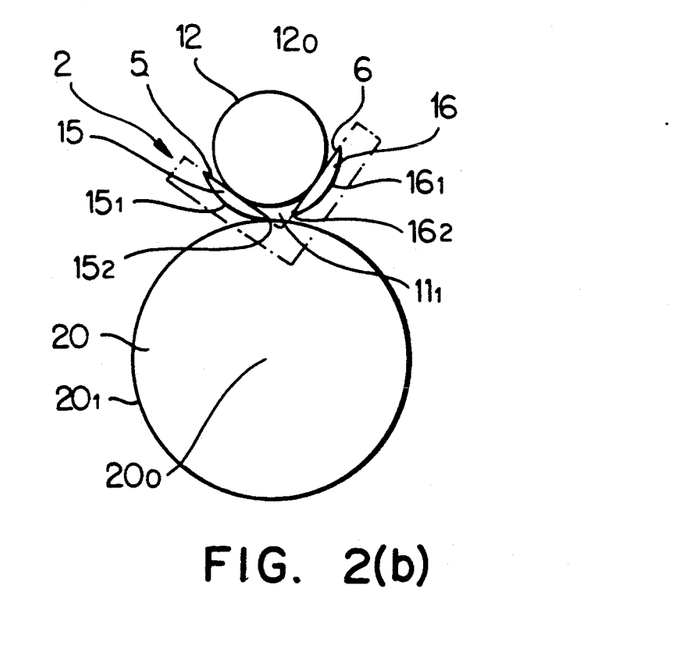

In the foregoing first embodiment, block 2 is ground using flat grindstone 13. A second embodiment of the invention, as shown in FIGS. 2(a) and 2(b), employs a cylindrical or columnar grindstone 20 positioned with an axis $20_0$ thereof in parallel with axis $12_0$ of columnar member 12. A circumference $20_1$ of grindstone 20 contacts edge line 10. Block 2 and grindstone 20 can be rotated about respective axes $12_0$ and $20_0$, while reducing the distance between these two axes until edges $15_2$ and $16_2$ of knife edge members 15 and 16 respectively are formed linearly in parallel with each other. Block 2 and grindstone 20 may be rotated in the same direction or in opposite directions. If they are rotated in the same direction, their circumferential velocities must have sufficient difference to permit grinding to occur.

The first embodiment, shown in FIGS. 1(a)–1(f) and the second embodiment, shown in FIGS. 2(a)–2(b) produce an identical product. However, the use of different grindstones require their description as separate embodiments.

Figure 3A:
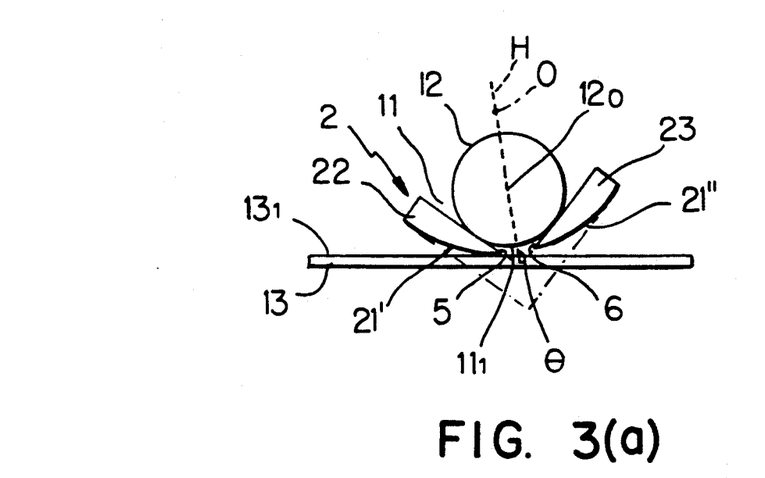
FIGS. 3(a) and 3(b) respectively are views of a second embodiment according to this invention.
Figure 3B:
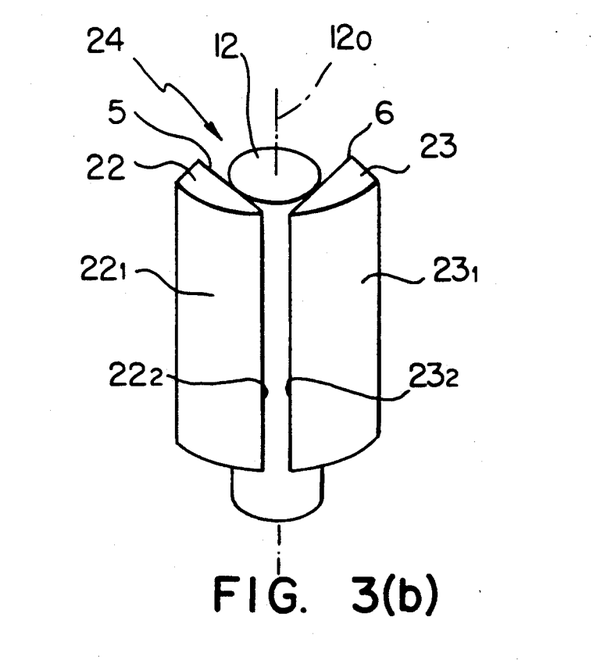

A third embodiment of this invention is described with reference to FIGS. 3(a) and 3(b).

In this embodiment, block 2 is positioned parallel to axis $12_0$ of columnar member 12. As shown in FIG. 3(a), a plane H divides angle theta of groove 11 into two equal parts. Block 2 is rotated about an axis O positioned on plane H on an opposite side of columnar member 12 from gap $11_1$, and parallel to the axis $12_0$ of columnar member 12. Block 2 is ground, contacting surface $13_1$ of grindstone 13, in the same manner as described in the first embodiment. Thus, a portion of block 2, shown by a dot-dash line, is removed to form arc-shaped surfaces 21' and 21", whose arcs are centered on axis O, on knife edge members 22 and 23. Surfaces 21' and 21" are polished to a mirror finish as in the prior embodiments. Tape guiding surfaces $22_1$ and $23_1$ and edges $22_2$ and $23_2$, as shown in FIG. 3(b), define a tape scraper 24 according to the third embodiment of the invention. As in the first embodiment, edges $22_2$ and $23_2$ are accurately in parallel with each other. Further, by selecting the optimum position of axis O, an optimum radius of tape guiding surfaces $22_1$ and $23_1$ on knife edge members 22 and 23 is produced. In this way, tape scraper 24 is given an optimum tape guiding surfaces $22_1$ and $23_1$ for positioning in the running route of magnetic tape T.

A fourth embodiment of this invention is described with reference to FIGS. 4(a) to 4(c).

Figure 4A:
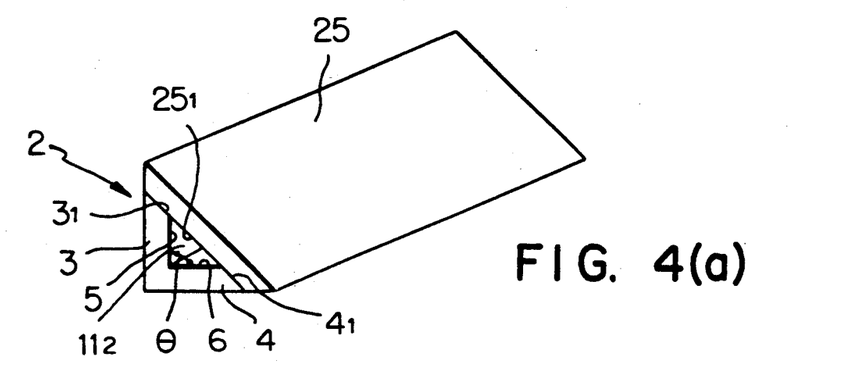
FIGS. 4(a) to 4(c) respectively are views of a third embodiment according to this invention.

As shown in FIG. 4(a), bevelled portions $3_1$ and $4_1$ are formed at tops of respective walls 3 and 4 of block 2. A connecting member 25 is mounted on bevelled portions $3_1$ and $4_1$, thereby connecting walls 3 and 4. A space $11_2$ is formed in block 2 between internal wall surfaces 5 and 6 and a surface $25_1$ of connecting member 25.

Figure 4B:
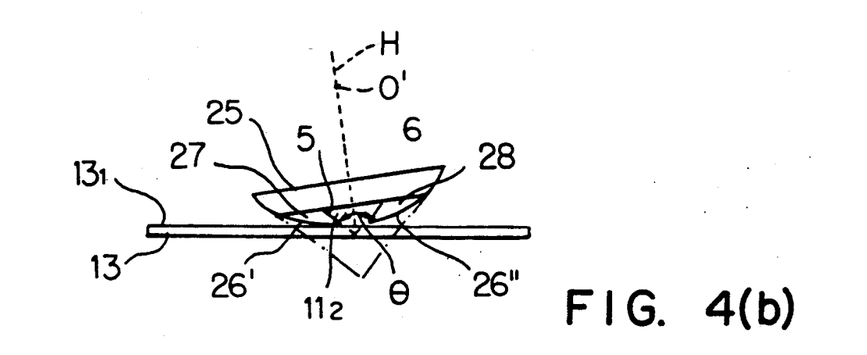
Figure 4C:
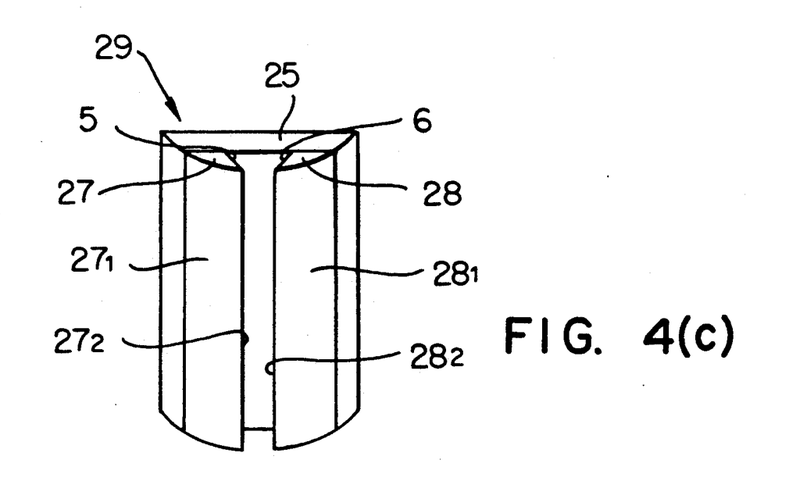

As shown in FIG. 4(b), block 2 is rotated about an axis O' positioned in a plane H dividing the angle theta of internal wall surfaces 5 and 6 into two equal parts and parallel to internal wall surfaces 5 and 6, while contacting grindstone 13. Grinding is made likewise in the first embodiment until grinding surface $13_1$ has moved upward to a position which opens space $11_2$. When grinding is completed, a portion of block 2, indicated by dot-dash lines, is removed, thereby forming arc-shaped contacting surfaces 26' and 26'' of knife edge members 27 and 28. The arcs of contacting surfaces 26' and 26'' are centered on axis O'. Contacting surfaces 26' and 26'' are polished to a mirror finish to form a tape scraper 29 having tape guiding surfaces $27_1$ and $28_1$ with edges $27_2$ and $28_2$ as shown in FIG. 4(c). As in the first embodiment, knife edge members 27 and 28, and edges $27_2$ and $28_2$ are formed accurately in parallel with each other.

Figure 5A:
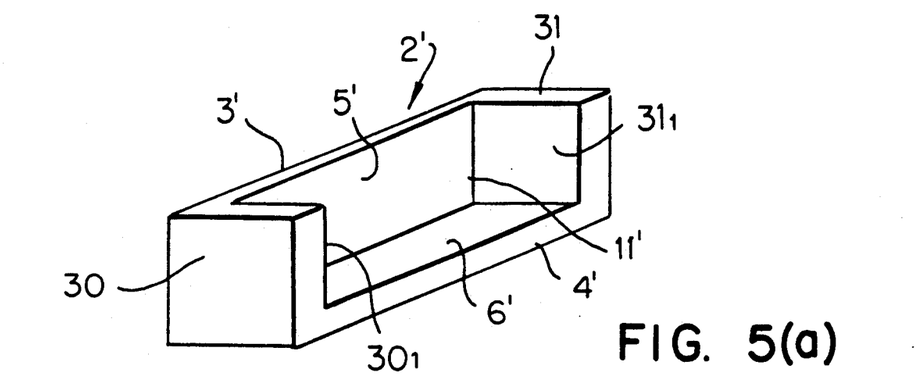
FIGS. 5(a) to 5(c) respectively are views of a fourth embodiment according to this invention.

A fifth embodiment of this invention is described with reference to FIGS. 5(a) to 5(c).

A block 2', made of the same material as L-shaped block 2 of the first embodiment. A center portion of block 2' is removed, leaving end walls 30 and 31. Walls 3' and 4' of block 2' remain joined to each other and to end walls 30 and 31. Walls 3' and 4' have internal wall surfaces 5' and 6'. Similarly, end walls 30 and 31 have internal surfaces $30_1$ and $31_1$, respectively. Groove 11' is bounded by internal surfaces $30_1$ and $31_1$ of side walls 30 and 31.

Figure 5B:
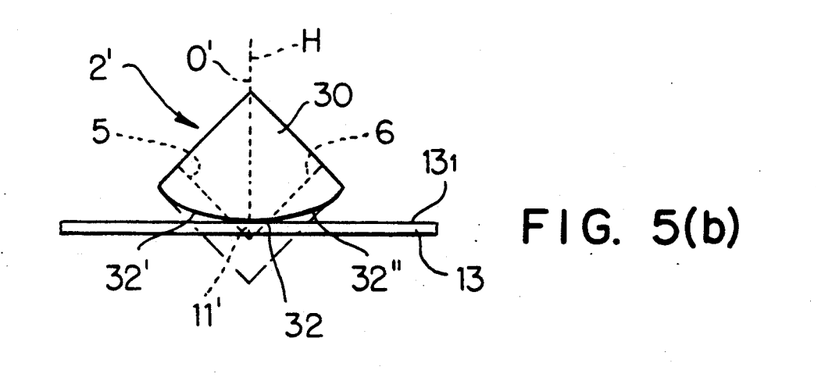

Referring now to FIG. 5(b), block 2' is rotated about an axis O', located on the bisector of the angle between internal surfaces 5' and 6' and parallel to internal wall surfaces 5 and 6, while contacting grindstone 13 to remove portions shown in dot-dash line, in a manner similar to the first embodiment. Grindstone 13 cuts past to produce a contacting surface 32. In the central portion, contacting surface 32 is divided into arc-shaped contacting surfaces 32' and 32''. End walls 30 and 31 maintain rigid alignment of contacting surfaces 32' and 32''.

Figure 5C:
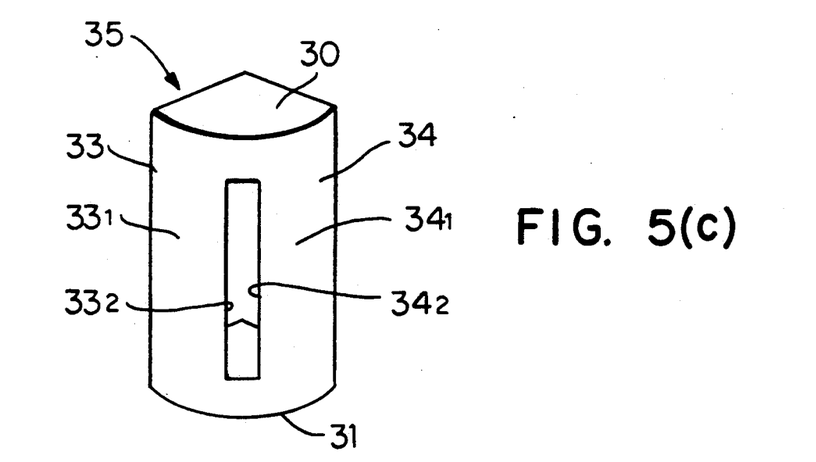

The resulting tape scraper 35 is shown in FIG. 5(c), wherein knife edge members 33 and 34 are joined together by end walls 30 and 31. Surfaces 32' and 32'' are given a mirror finish to produce tape scraper 35 with tape guiding surfaces $32_1$ and $34_1$ and edges $33_2$ and $34_2$. According to the present process, since a central part of block 2' is ground away, leaving end walls 30 and 31 in a longitudinal direction, a separate connecting means (such as columnar member 12 or connecting member 25 in other embodiments) for connecting walls 3 and 4 is not required.

Thus, edges $33_2$ and $34_2$ are integrally formed and are held rigidly in parallel with each other.

A sixth embodiment of this invention is described with reference to FIGS. 6(a) to 6(c).

Figure 6A:
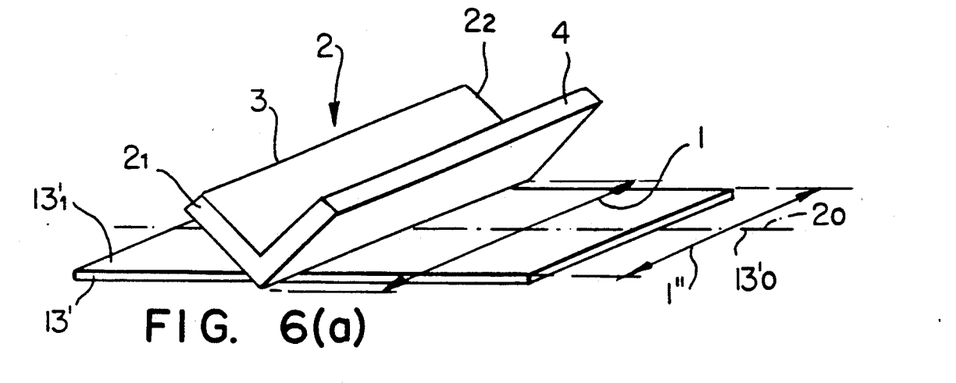
FIGS. 6(a) to 6(c) respectively are views of a fifth embodiment according to this invention.

As shown in FIG. 6(a), an L-shaped block 2 is formed from a solid block 1 in the same manner as in the first embodiment. A center portion of This L-shaped block 2 is ground by a flat sheet shaped grindstone 13' having a longitudinal size I'' that is smaller than a longitudinal size I of block 2. A longitudinal center line $13_0$ of grindstone 13' is aligned with a longitudinal center line $2_0$ of block 2. A grinding surface $13'_1$ of grindstone 13' is maintained parallel with an axis O'.

Figure 6B:
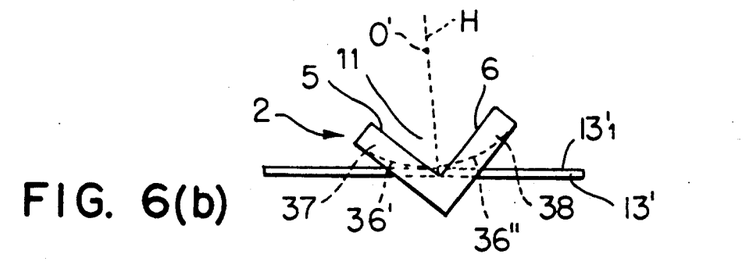
Figure 6C:
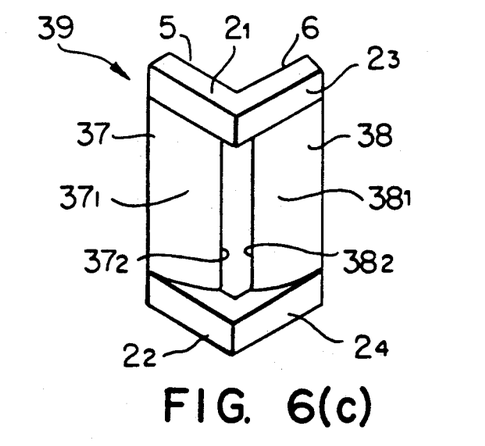

Referring to FIG. 6(b), block 2 is rotated about axis O' during grinding in the same manner as in the first embodiment. A first uncut side $2_3$ and a second uncut side $2_4$, having substantially equal widths, are not ground by grindstone 13'.

When grindstone 13' cuts into groove 11 during grinding, surfaces 36' and 36'' of L-shaped block 2 are ground in an arc shape about axis O' to form knife edge member 37 and 38. Knife edge members remain rigidly connected together by uncut sides $2_3$ and $2_4$, as shown in FIG. 6(c). Contacting surfaces 36' and 36'' are given a mirror finish to produce tape guiding surfaces $37_1$ and $38_1$ with edges $37_2$ and $38_2$.

The spacing between uncut sides $2_3$ and $2_4$ is preferably substantially equal to a width of the magnetic tape with which it is to be used. In this manner, uncut sides $2_3$ and $2_4$ serve as tape edge guides, without requiring the provision of separate elements to perform this function. In some embodiments of the invention, it may be desirable to provide a distance between uncut sides $2_3$ and $2_4$ that is slightly less than a width of the tape with which the apparatus is to work. The amount by which this distance is less than the width of the tape may be sufficient to permit the contact of the tape with the uncut sides to provide a centrally directed restoring force, but not so much that the edges of the tape are folded or otherwise permanently deformed. In most cases, satisfactory tape guidance is attained when the distance between the uncut sides is substantially equal to the tape width. If the distance exceeds the tape width, then the function of tape guidance may be foregone, but the function of retaining the elements together in a unitary assembly remains operative.

According to the process of this invention, the first, second and third embodiments employ a columnar member 12 to retain the elements of the tape scraper together. The fourth embodiment employs a connecting member 25 for this purpose. The fifth and sixth embodiments do not require a columnar member 12 or a connecting member 25. These embodiments are formed unitarily from a block by grinding in such a manner that end walls 30 and 31 (FIG. 5, fifth embodiment) or uncut sides $2_3$ and $2_4$ (FIG. 6, sixth embodiment) remain to hold the tape scraper together.

In any one of the first to sixth embodiments, the angle theta of groove 11(11') between internal wall surfaces 5(5') and 6(6') of block 2(2'), is disclosed as being 90 degrees. However, other suitable angles between 0 and 180 degrees may be used.

Any of the embodiments may use the flat grindstone of the first embodiment or the cylindrical grindstone of the second embodiment without departing from the spirit and scope of the present invention.

As discussed above, it is to be understood that a pair of edges can be formed integrally by means of a simple production process.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A process for producing a tape scraper having a pair of edges contacting a surface of a tape, comprising:

forming a block having a flattened first wall surface and a flattened second wall surface;

said first and second wall surfaces being disposed at an angle to form a nearly V-shaped groove in a longitudinal direction;

fixing a columnar member with said block so that an axis of said columnar member is positioned in parallel with said first and second wall surfaces, and a circumference thereof contacts said first and second wall surfaces; and rotating said block about an axis on a bisector of said angle and parallel to said axis of said columnar member, while contacting said block with a grindstone having a contacting surface parallel with said axis, thereby grinding a surface of said block so as to reach a space between said first and second wall surfaces, and said circumference of said columnar member.

2. A process for producing a tape scraper provided with a pair of edges contacting a surface of a tape, comprising:

forming a block having a flattened surface of a first wall and a flattened surface of a second wall;

said first and second flattened surfaces being disposed at an angle with respect to each other to form a nearly V-shaped groove in a longitudinal direction;

connecting said first wall and said second wall together with a connecting member; and rotating said block about an axis disposed in a plane bisecting said angle, and parallel with said flattened surfaces of said first and second walls, while contacting said block with a grindstone having a contacting surface parallel with said axis, thereby grinding said block by said grindstone until said surface of said first wall and said surface of said second wall are cut off.

3. A process for producing a tape scraper provided with a pair of edges contacting a surface of a tape, comprising:

preparing a block having a first flattened surface of a first wall and a second flattened surface of a second wall;

the step of preparing including maintaining first and second opposing end walls in a longitudinal direction of said block;

disposing said first and second flattened surfaces at an angle with respect to each other to form a nearly V-shaped groove; and rotating said block about an axis disposed in a plane bisecting said angle, and parallel to said first and second flattened surfaces of said first and second walls, while contacting with said block a grindstone having a contacting surface parallel with said axis, thereby grinding said block by said grindstone until said surface of said first wall and said surface of said second wall are cut off.

4. A process for producing a tape scraper provided with a pair of edges contacting a surface of a tape comprising:

forming a block having a flattened first wall surface and a flattened second wall surface;

said first and second flattened wall surfaces being disposed at an angle with respect to each other to form a nearly V-shaped groove in a longitudinal direction;

rotating said block about an axis in a plane bisecting said angle, and parallel to said first and second flattened wall surfaces;

contacting a grindstone with said block;

a contacting surface of said grindstone being parallel to said axis and having a longitudinal dimension that is smaller than a longitudinal dimension of said block;

continuing grinding said block until said first wall surface and said second wall surface are opened to open said groove, and form knife edge members having first and second knife edges facing each other; and first and second uncut portions of said block, beyond a length of said grindstone, retaining said first and second knife edge members in a rigid assembly.

5. A method for producing a tape scraper comprising:

forming an L-shaped block having a first wall including a first internal surface, and a second wall having a second internal surface;

said first and second internal surfaces being inclined to each other at an angle;

polishing said first and second internal surfaces to a mirror finish;

said first and second internal surfaces forming a groove at a junction thereof;

supporting said first and second walls against relative motion;

grinding an outer surface of said L-shaped block in an arc;

positioning a center of said arc along a bisector of said angle;

continuing said grinding until at least a portion of said groove is opened, thereby forming first and second arc-shaped tape-guiding surfaces;

said first and second tape-guiding surfaces having first and second parallel knife edges facing each other; and polishing said first and second tape-guiding surfaces.

6. A method according to claim 5, wherein the step of supporting includes:

affixing a columnar member to said first and second internal surfaces;

said columnar member and said first and second surfaces forming a space therebetween;

the step of grinding stopping short of contacting said columnar member.

7. A method according to claim 5, wherein the step of supporting includes:

affixing a columnar member to said first and second internal surfaces; and positioning a center of said arc includes positioning a center of said arc on an axis of said columnar member.

8. A method according to claim 5, wherein the step of supporting includes:

affixing a columnar member to said first and second internal surfaces; and positioning a center of said arc includes positioning a center of said arc parallel to an axis of said columnar member.

9. A method according to claim 5, wherein the step of supporting includes:

forming first and second end walls at distal ends of said L-shaped block; and stopping the step of continuing said grinding at a point at which said first and second end walls support said first and second arc-shaped tape-guiding surfaces.

10. A method according to claim 5, wherein the step of supporting includes:

performing the step of grinding in a center portion of said L-shaped block whereby first and second uncut sides remain at distal ends of said L-shaped block, the first and second uncut sides rigidly supporting said first and second walls before and after grinding.

11. A method according to claim 5, wherein the step of grinding includes:
contacting said L-shaped block against a planar grindstone surface;
rotating said L-shaped block about said center of arc; and
moving said surface and said center of arc closer to each other.

12. A method according to claim 5, wherein the step of grinding includes:
contacting said L-shaped block against a cylindrical surface of a grindstone;
rotating said grindstone about its axis;
rotating said L-shaped block about said center of arc; and
moving said cylindrical surface and said center of arc closer to each other.

13. A method according to claim 5, wherein the step of supporting includes affixing a connecting member between ends of said first and second walls.

14. A method according to claim 5, wherein the step of supporting includes:
performing the step of grinding in a center portion of said L-shaped block whereby first and second uncut sides remain at distal ends of said L-shaped block, the first and second uncut sides rigidly supporting said first and second walls before and after grinding; and
a spacing between said first and second uncut sides being at least substantially equal to a width of a tape to be scraped by said tape scraper, whereby said first and second uncut sides form edge guides for said tape.

15. A process for producing a tape scraper provided with a pair of edges contacting a surface of a tape comprising:
forming a block having a flattened first wall surface and a flattened second wall surface;
said first and second flattened wall surfaces being disposed at an angle with respect to each other to form a nearly V-shaped groove in a longitudinal direction;
rotating said block about an axis in a plane bisecting said angle, and parallel to said first and second flattened wall surfaces;
contacting a grindstone with said block;
a contacting surface of said grindstone being parallel to said axis and having a longitudinal dimension that is smaller than a longitudinal dimension of said block;
continuing grinding said block until said first wall surface and said second wall surface are opened to open said groove, and form knife edge members having first and second knife edges facing each other;
first and second uncut portions of said block, beyond a length of said grindstone, retaining said first and second knife edge members in a rigid assembly;
a distance between said first and second wall surfaces being a predetermined amount less than a width of a tape with which said tape scraper is to be used; and
said predetermined amount being sufficiently large to provide a centrally directed force upon said tape, but sufficiently small to avoid folding or permanent deformation of edges of said tape.

* * * * *